US012251585B2

(12) United States Patent
Johnson

(10) Patent No.: US 12,251,585 B2
(45) Date of Patent: Mar. 18, 2025

(54) ATTACHMENT FOR HYDRAULIC RAM RESCUE TOOL

(71) Applicant: Jeffery L. Johnson, Wingate, NC (US)

(72) Inventor: Jeffery L. Johnson, Wingate, NC (US)

( * ) Notice: Subject to any disclaimer, the term of this patent is extended or adjusted under 35 U.S.C. 154(b) by 116 days.

(21) Appl. No.: 17/907,030

(22) PCT Filed: Apr. 20, 2021

(86) PCT No.: PCT/US2021/028059
§ 371 (c)(1),
(2) Date: Sep. 22, 2022

(87) PCT Pub. No.: WO2021/216483
PCT Pub. Date: Oct. 28, 2021

(65) Prior Publication Data

US 2023/0129231 A1 Apr. 27, 2023

Related U.S. Application Data

(60) Provisional application No. 63/175,865, filed on Apr. 16, 2021, provisional application No. 63/012,639, filed on Apr. 20, 2020.

(51) Int. Cl.
*A62B 3/00* (2006.01)

(52) U.S. Cl.
CPC .................................... *A62B 3/005* (2013.01)

(58) Field of Classification Search
None
See application file for complete search history.

(56) References Cited

U.S. PATENT DOCUMENTS

| | | | | |
|---|---|---|---|---|
| 4,273,311 | A | 6/1981 | Rio | |
| 4,834,352 | A * | 5/1989 | Thornton | B25B 5/163 269/254 R |
| 5,732,932 | A | 3/1998 | Michalo | |
| 6,158,705 | A | 12/2000 | Cudmore et al. | |
| 7,240,885 | B1 | 7/2007 | Sullivan | |
| 7,568,372 | B1 * | 8/2009 | Patton | A62B 3/005 72/464 |
| 8,387,487 | B2 * | 3/2013 | Herr | A62B 3/005 81/26 |
| 2012/0137832 | A1 | 6/2012 | Herr et al. | |
| 2012/0298940 | A1 | 11/2012 | Lindner et al. | |

FOREIGN PATENT DOCUMENTS

EP 2217330 B1 3/2012

* cited by examiner

*Primary Examiner* — Brian D Keller
*Assistant Examiner* — Jason Khalil Hawkins
(74) *Attorney, Agent, or Firm* — Sisson & Banyas, Attorneys at Law, LLC; Jeffrey J. Banyas

(57) ABSTRACT

It is described herein an attachment for a hydraulic ram. The attachment comprises a base comprising a base first edge, a base second edge, a base first end, and a base second end defining a base horizontal plane. The base has a base top surface and a base bottom surface with a base wall spanning a distance between the base top surface and the base bottom surface. A hydraulic ram attachment mechanism is connected to the base top surface. A first plurality of teeth extend from the base bottom surface along at least a portion of the base first edge, and a second plurality of teeth extend from the base bottom surface along at least a portion of the base second edge.

20 Claims, 13 Drawing Sheets

ATTACHMENT FOR HYDRAULIC RAM RESCUE TOOL

CROSS REFERENCES AND PRIORITIES

This Application claims priority from U.S. Provisional Application No. 63/175,865 filed on 16 Apr. 2021, and U.S. Provisional Application No. 63/012,639 filed on 20 Apr. 2020, and International Application No. PCT/US2021/028059 filed on 20 Apr. 2021 the teachings of each of which are incorporated by reference herein in their entirety.

BACKGROUND

Typically, spreaders such as those utilizing hydraulic rams have been used to aid in rescuing victims trapped within cars, trucks, aircraft, farm machinery, and the like following accidents. Fire departments, police departments, paramedics, and others engaged in emergency rescue work often use these tools to pry wreckage away from a trapped victim so that the victim can be safely and quickly removed from the wreckage.

Ends of the spreader apply opposing force between two surfaces of the wreckage—such as the vehicle floor and the vehicle dashboard which has collapsed. Typically, the hydraulic ram will have plates on either end for support or bracing on the solid surfaces. In conventional spreaders, these plates are flat.

One example of a hydraulic ram plate is disclosed in U.S. Pat. No. 4,273,311 which teaches a flat, pivotable plate attached to each of two hydraulic force arms for spreading wreckage. The spreader plates also include a serrated gripping surface.

Other spreaders utilize U-shaped plates which substantially complement the shape of a steering column of a vehicle. However, due to the smooth surfaces of the plate metal on the metal column, a suitable grip is not attained and the tool tends to slip. Further, there is no angle to the tools so that the flat side of the tool is required to apply pressure to an angled steering column.

Others have proposed modification to hydraulic ram plates designed to not only complement the shape of areas of the vehicle, but also to provide improved grip during operation. One such solution is proposed in U.S. Pat. No. 5,732,932 which teaches to include both lateral and transverse cuts to allow better grabbing ability.

To date, the proposed hydraulic ram plates remain difficult to control in a variety of different situations due to not being stably secured onto objects of different sizes and shapes. The need exists, therefore, for an improved accessory for hydraulic rams that increases stabilization and control.

SUMMARY

It is described herein an attachment for a hydraulic ram comprising a base, a hydraulic ram attachment mechanism, and at least a first plurality of teeth and a second plurality of teeth. The base comprises a base first edge, a base second edge, a base first end, and a base second end defining a base horizontal plane having a base top surface and a base bottom surface. A base wall spans a distance between the base top surface and the base bottom surface. The hydraulic ram attachment mechanism is connected to the base top surface. The first plurality of teeth extend from the base bottom surface along at least a portion of the base first edge. The second plurality of teeth extend from the base bottom surface along at least a portion of the base second edge.

In some embodiments, the base wall may comprise at least one first base hole along the base first edge. The base wall may also comprise at least one second base hole along the base second edge. In such embodiments, the first plurality of teeth may be integrally connected to a first tooth plate comprising at least one first tooth plate hole. The second plurality of teeth may then be integrally connected to a second tooth plate comprising at least one second tooth late hole. The first tooth plate in such embodiments may be connected to the base along the base first edge by at least a first fastener passing through the first tooth plate hole and into the first base hole. In such embodiments, the second tooth plate may be connected to the base along the base second edge by at least a second fastener passing through the second tooth plate hole and into the second base hole.

In certain such embodiments, the base first edge may comprise a first lip at the base top surface. A top edge of the first tooth plate may abut against the first lip. The base second edge may comprise a second lip at the base top surface. A top edge of the second tooth plate may abut against the second lip.

Some embodiments may further comprise at least a third plurality of teeth and a fourth plurality of teeth. The third plurality of teeth may extend from the base bottom surface along at least a portion of the base first end. The fourth plurality of teeth may extend from the base bottom surface along at least a portion of the base second end.

In certain such embodiments, the base wall may comprise at least one third base hole along the base first end. The base may also comprise at least one fourth base hole along the base second end. In such embodiments, the third plurality of teeth may be integrally connected to a third tooth plate comprising at least one third tooth plate hole. The fourth plurality of teeth may be integrally connected to a fourth tooth plate comprising at least one fourth tooth plate hole. The third tooth plate in such embodiments may be connected to the base along the base first end by at least a third fastener passing through the third tooth plate hole and into the third base hole. In such embodiments, the fourth tooth plate may be connected to the base along the base second end by at least a fourth fastener passing through the fourth tooth plate hole and into the fourth base hole.

In some such embodiments, the base first end may comprise a third lip at the base top surface. A top edge of the third tooth plate may abut against the third lip. The base second end may comprise a fourth lip at the base top surface. A top edge of the fourth tooth plate may abut against the fourth lip.

In certain embodiments, the attachment may further comprise at least one spike connected to and extending from the base bottom surface. When used, the at least one spike will have a spike length which may be substantially equal to a first tooth length of the first plurality of teeth, a second tooth length of the second plurality of teeth, a third tooth length of the third plurality of teeth, and/or a fourth tooth length of the fourth plurality of teeth.

In some such embodiments, the at least one spike may comprise a plurality of spikes. The plurality of spikes may be arranged in an "X" pattern along the base bottom surface.

In some embodiments, the hydraulic ram attachment mechanism may comprise a cylinder having a radial cross-sectional inner profile shape selected from the group consisting of circular, ovular, quadrilateral, and polygonal.

In certain embodiments, the hydraulic ram attachment mechanism may comprise at least one reinforcing rib. Each reinforcing rib may comprise a first edge and a second edge extending substantially perpendicular from the first edge. The first edge of each reinforcing rib may be integrally connected to an outer surface of the cylinder. The second edge of each reinforcing rib may be integrally connected to the base top surface.

In some embodiments the base may be made of a first material comprising aluminum. The first plurality of teeth and the second plurality of teeth may each independently be made of a material comprising steel. The third plurality of teeth and the fourth plurality of teeth may each independently be made of a material comprising steel.

Also described herein is a hydraulic ram comprising at least a first attachment and a second attachment. The first attachment may be of any type described herein. The second attachment may be of any type described herein. The first attachment may be connected to a hydraulic ram first end. The second attachment may be connected to a hydraulic ram second end opposite the hydraulic ram first end.

DETAILED DESCRIPTION

Disclosed herein is an extension for a hydraulic ram. Also disclosed herein is a hydraulic ram comprising one or more extensions. As described herein and in the claims, the following numbers refer to the following structures as noted in the Figures.

10 refers to a hydraulic ram.
100 refers to an attachment.
110 refers to a base.
111 refers to a base first edge.
112 refers to a base second edge.
113 refers to a base first end.
114 refers to a base second end.
115 refers to a base horizontal plane.
116 refers to a base top surface.
117 refers to a base bottom surface.
118 refers to a base wall.
119 refers to a lip.
120 refers to a hydraulic ram attachment mechanism.
121 refers to a circular cylinder having a circular cross-sectional inner profile.
122 refers to a circular cylinder having a quadrilateral cross-sectional inner profile.
123 refers to a reinforcing rib.
130 refers to a first plurality of teeth.
131 refers to a first tooth plate.
132 refers to a first tooth plate hole.
133 refers to a tooth length.
134 refers to a tooth width.
140 refers to a second plurality of teeth.
141 refers to a second tooth plate.
142 refers to a second tooth plate hole.
150 refers to a third plurality of teeth.
151 refers to a third tooth plate.
152 refers to a third tooth plate hole.
160 refers to a fourth plurality of teeth.
161 refers to a fourth tooth plate.
162 refers to a fourth tooth plate hole.
200 refers to a fastener.
210 refers to a base hole.
300 refers to a spike.
400 refers to a strap.
410 refers to a channel.

Figure 1:
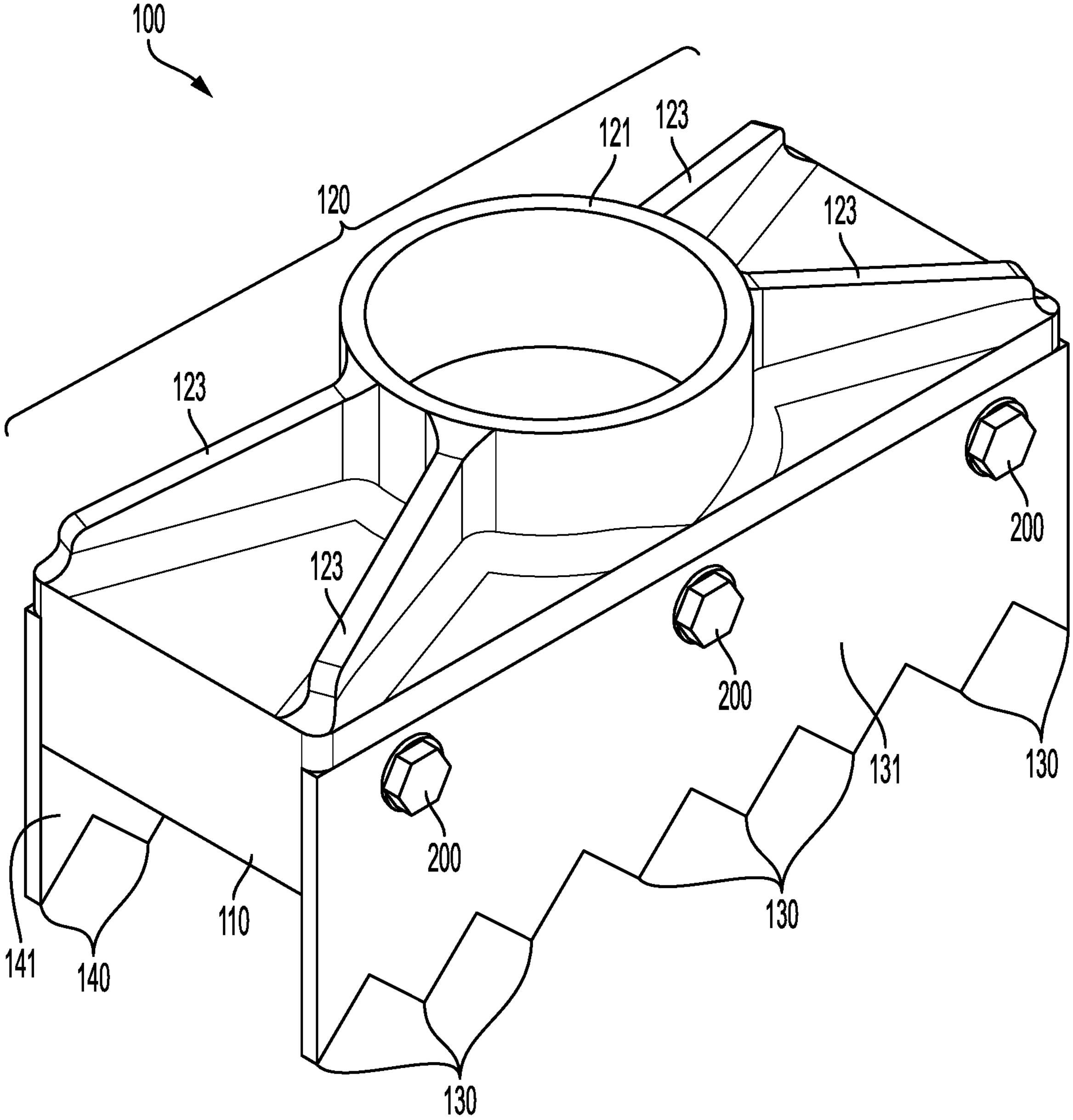
FIG. 1 is an assembled perspective view of one embodiment of an extension for a hydraulic ram.
Figure 10:
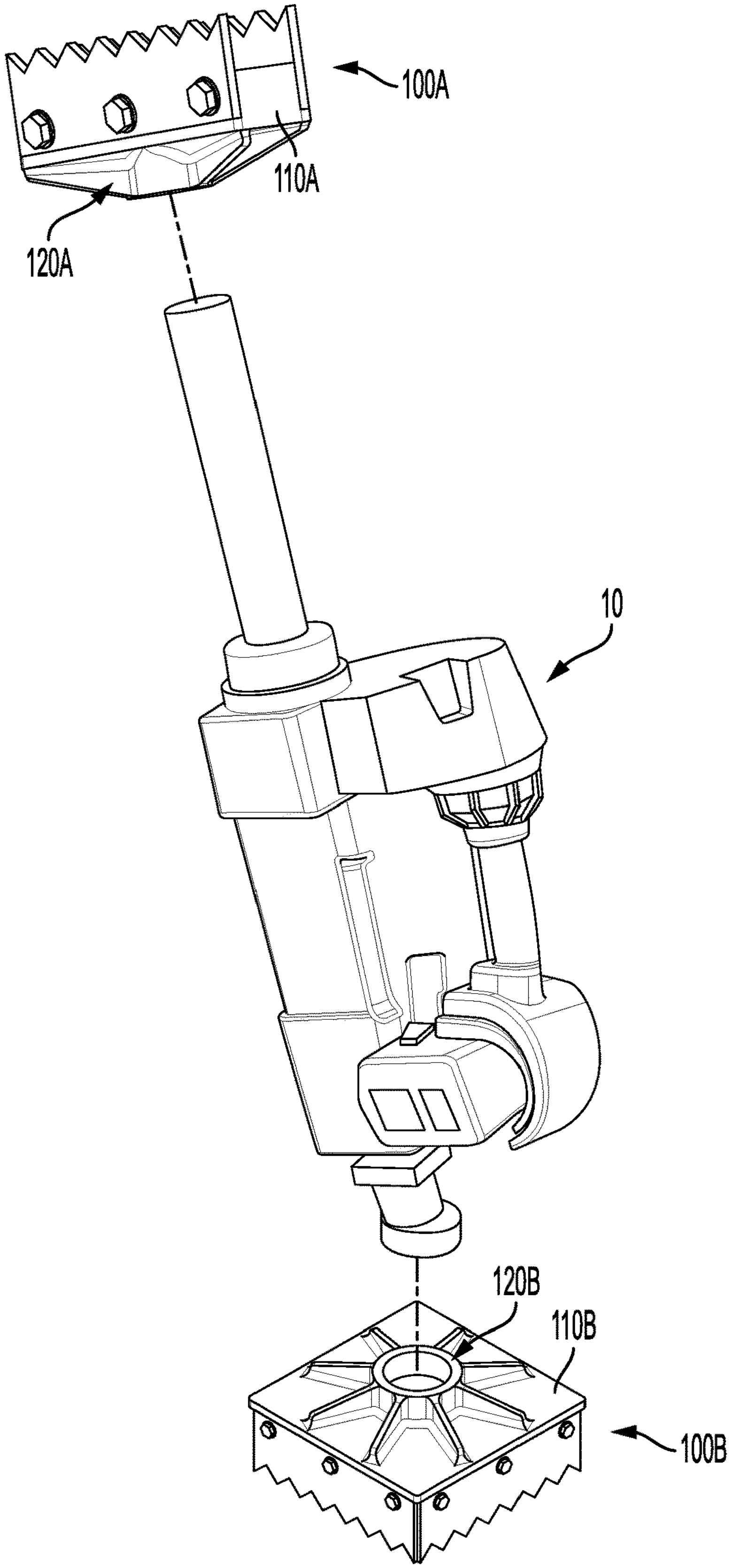
FIG. 10 is an exploded perspective view of two embodiments of extensions for a hydraulic ram at opposing ends of a hydraulic ram.

FIG. 1 shows an assembled perspective view of one embodiment of an attachment (100) for a hydraulic ram (10 as shown in FIG. 10). As shown in FIG. 1, the attachment comprises a base (110), a hydraulic ram attachment mechanism (120), and at least a first plurality of teeth (130) and a second plurality of teeth (140).

Figure 2:
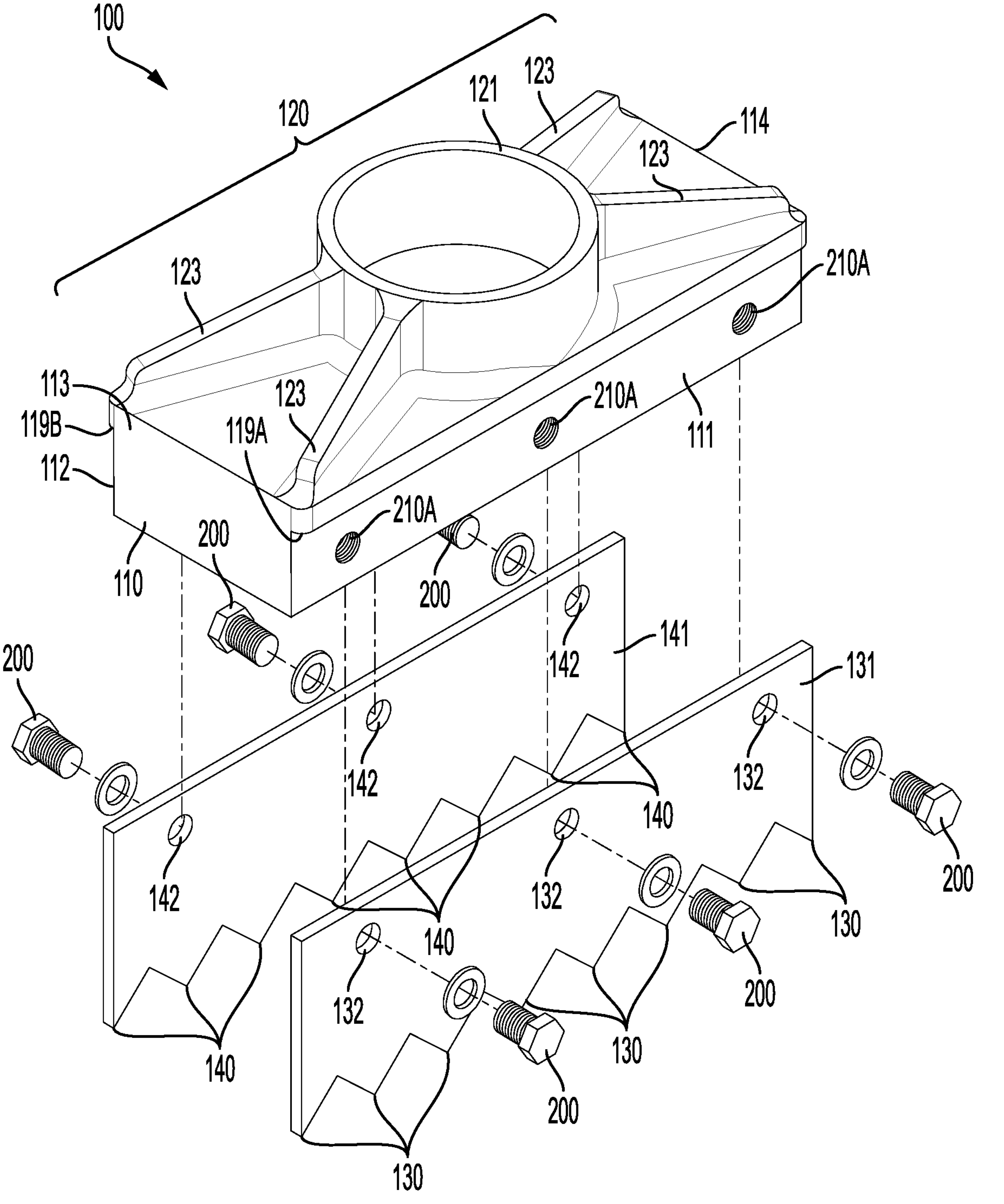
FIG. 2 is an exploded perspective view of the embodiment of an extension for a hydraulic ram of FIG. 1.

FIG. 2 shows an exploded view of the embodiment of an attachment (100) for a hydraulic ram shown in FIG. 1. As shown in FIG. 2, the base (110) has a base first edge (111), a base second edge (112) opposite the base first edge, a base first end (113), and a base second end (114) opposite the base first end. This gives the base a quadrilateral profile, although other profiles may exist including a circular profile, an ovular profile, and a polygonal profile.

Figure 4:
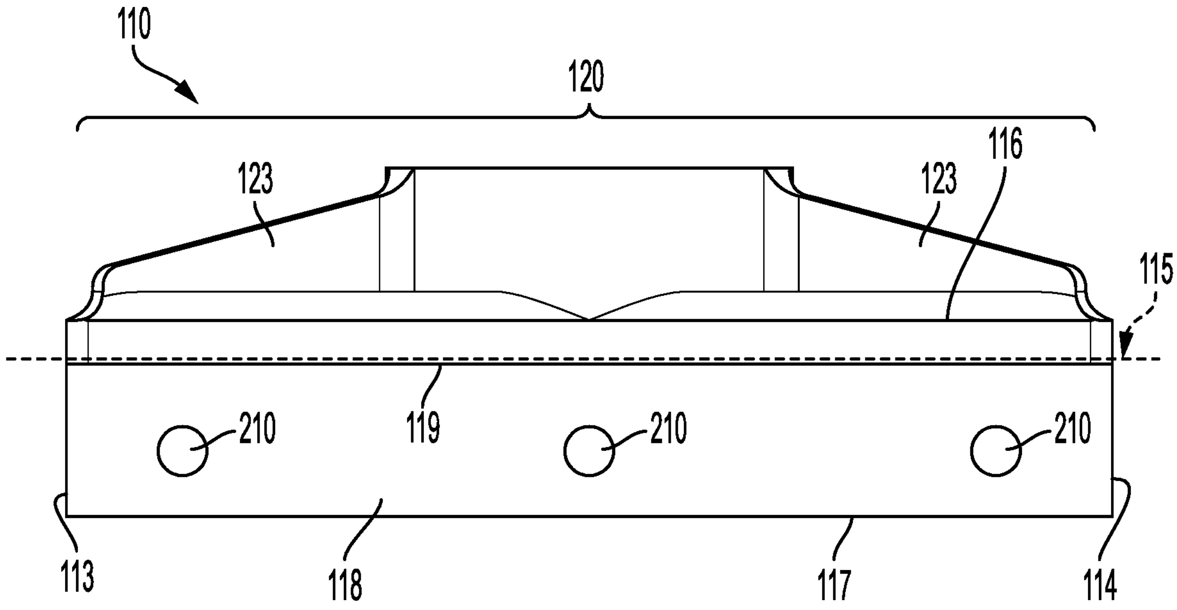
FIG. 4 is a side view of one embodiment of a base for an extension for a hydraulic ram.
Figure 6:
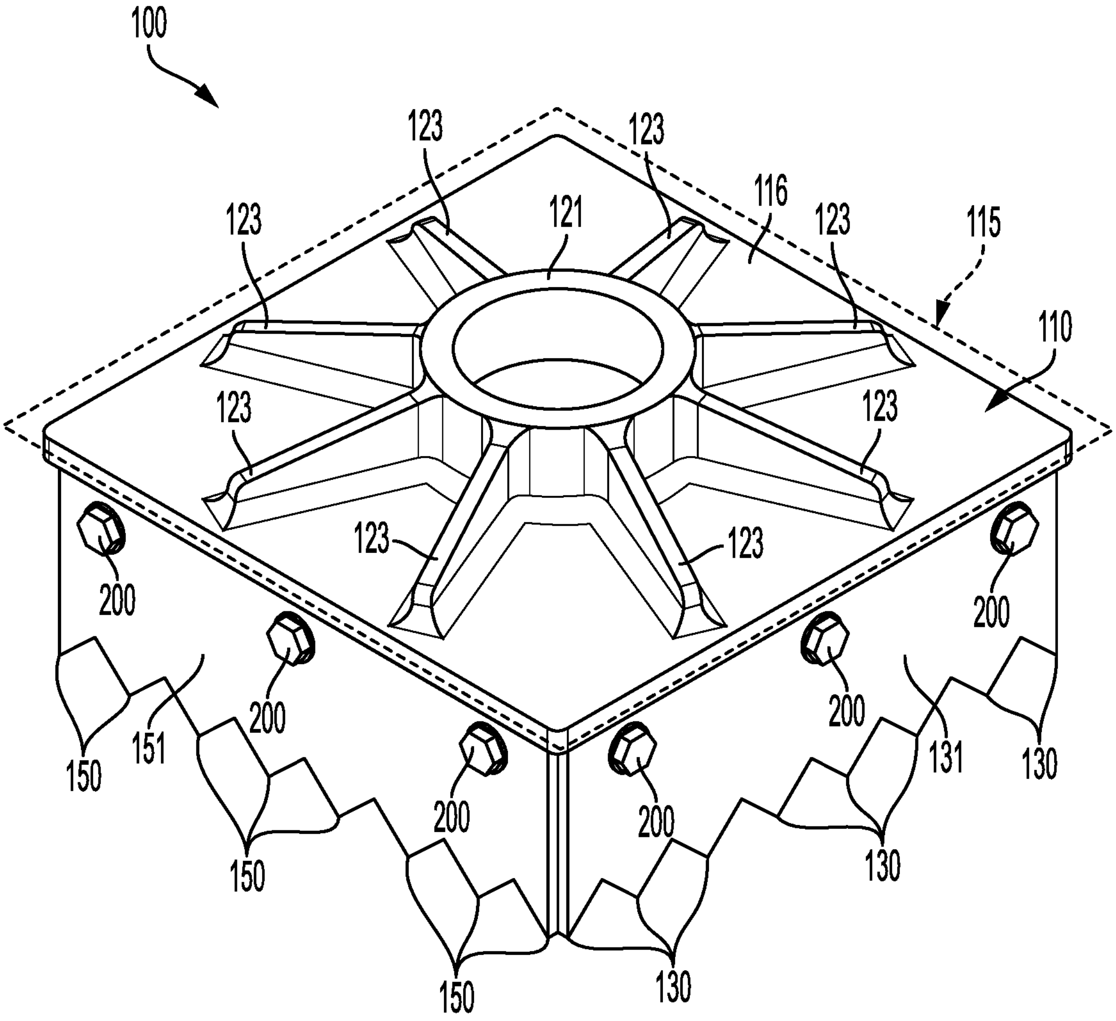
FIG. 6 is an assembled perspective view of another embodiment of an extension for a hydraulic ram.

The base first edge (111), base second edge (112), base first end (113), and base second end (114) define a base horizontal plane (115 as shown in FIG. 6) having a base top surface (116 as shown in FIG. 4) and a base bottom surface (117 as shown in FIG. 4) opposite the base top surface. A distance between the base top surface and the base bottom surface defines a base wall (118 as shown in FIG. 4) which may also be referred to as the base thickness.

Figure 12:
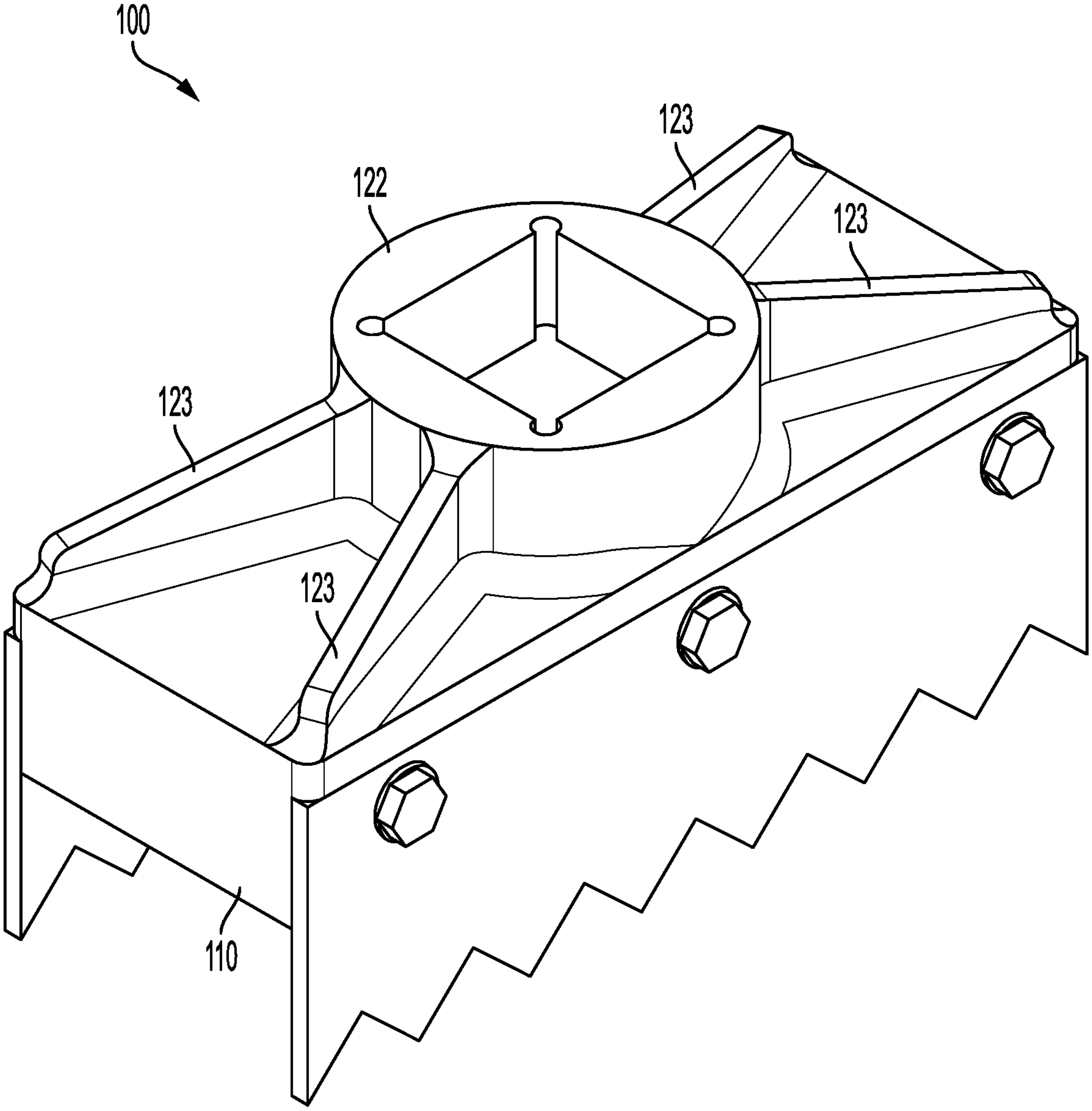
FIG. 12 is an assembled perspective view of an alternative embodiment of an extension for a hydraulic ram.

FIG. 1 and FIG. 2 also shows an embodiment of a hydraulic ram attachment mechanism (120). In the embodiment shown in FIG. 1 and FIG. 2, the hydraulic ram attachment mechanism comprises a circular cylinder having a circular cross-sectional inner profile (121) adapted to receive an end of the hydraulic ram (10 as shown in FIG. 10). By adapted to receive an end of the hydraulic ram, it is meant that the circular cylinder has interior dimensions which are sized and shaped to mate with the exterior dimensions of the end of the hydraulic ram. While FIG. 1 and FIG. 2 shows the hydraulic ram attachment mechanism comprising cylinder having a circular radial cross-sectional inner profile, other shapes may be utilized to mate with the exterior dimensions of a hydraulic ram having different cross-sectional shapes. For example, the hydraulic ram attachment mechanism may comprise a cylinder having a radial cross-sectional inner profile shape which is quadrilateral (122 as shown in FIG. 12), ovular, or polygonal.

The hydraulic ram attachment mechanism (120) will be connected to the base top surface (116 as shown in FIG. 4) as shown in FIG. 1 and FIG. 2. The connection between the hydraulic ram attachment mechanism and the base top surface may take many forms. In some embodiments, the hydraulic ram attachment mechanism and the base top surface may be integrally connected such as by manufacturing the base and the hydraulic ram attachment mechanism of a single integral piece of material or by welding. In other embodiments, the hydraulic ram attachment mechanism may be connected to the base top surface by one or more fasteners such as a bolt, a screw, a clip, a rivet, a pin, or the like.

In some embodiments, the hydraulic ram attachment mechanism (120) may include one or more reinforcing ribs (123) designed to limit or prevent the cylinder from bending or pivoting about its central axis during operation. When used, each reinforcing rib will comprise at least a first edge and a second edge extending substantially perpendicular from the first edge. When used, the first edge of the reinforcing rib may be connected—preferably integrally connected—to an outer surface of the cylinder with the reinforcing rib extending away from the cylinder as shown in FIG. 1 and FIG. 2. The second edge of the reinforcing rib may then be connected—preferably integrally connected—to the base top surface (116 as shown in FIG. 4) as shown in FIG. 1 and FIG. 2.

The number and location of reinforcing ribs (123) is not considered important. When used, the number of reinforcing ribs may be an integer selected from the group consisting of between 1 and 20, between 1 and 15, between 1 and 10, between 1 and 5, between 2 and 20, between 2 and 15, between 2 and 10, between 2 and 5, between 4 and 20, between 4 and 15, or between 4 and 10. In the embodiment shown in FIG. 1 and FIG. 2, the hydraulic ram attachment mechanism includes four reinforcing ribs.

FIG. 1 also shows an embodiment of the configuration of the first plurality of teeth (130) and the second plurality of teeth (140). In the embodiment shown in FIG. 1, the first plurality of teeth extend from the base bottom surface (117 as shown in FIG. 4) along at least a portion of the base first edge (111 as shown in FIG. 2). Similarly, in the embodiment shown in FIG. 1, the second plurality of teeth extend from the base bottom surface along at least a portion of the base second edge (112 as shown in FIG. 2). Preferably one or both of the first plurality of teeth and/or the second plurality of teeth will extend from the base bottom surface substantially perpendicular or perpendicular with the base horizontal plane (115 as shown in FIG. 4 and FIG. 6).

While the first plurality of teeth and second plurality of teeth may be integrally connected to the respective base edges—such as by manufacturing the base and the first plurality of teeth and/or the second plurality of teeth from a single integral piece of material—the preferred embodiments will have detachable teeth which are connected to the base by means of a fastener as described herein.

While the Figures show the first plurality of teeth along the entirety of the base first edge and the second plurality of teeth along the entirety of the base second edge, this is not considered necessary. In some embodiments, the first plurality of teeth may extend along only a portion of the base first edge and/or the second plurality of teeth may extend along only a portion of the base second edge.

In some embodiments, the first plurality of teeth (130) will be connected to a first tooth plate (131) with the first tooth plate connected to the base first edge (111 as shown in FIG. 2) as shown in FIG. 1. When used, the first plurality of teeth are preferably integrally connected to the first tooth plate such as by manufacturing the first plurality of teeth and the first tooth plate of a single integral piece of material. The first tooth plate may be connected to the base first edge by at least one fastener (200) such as a bolt, a screw, a clip, a rivet, or the like.

Similarly, in some embodiments the second plurality of teeth (140) will be connected to a second tooth plate (141) with the second tooth plate connected to the base second edge (112 as shown in FIG. 2) as shown in FIG. 1. When used, the second plurality of teeth are preferably integrally connected to the second tooth plate such as by manufacturing the second plurality of teeth and the second tooth plate of a single integral piece of material. The second tooth plate may be connected to the base second edge by at least one fastener (200) such as a bolt, a screw, a clip, a rivet, or the like.

FIG. 2 shows an exploded perspective view of the embodiment of the attachment (100) for a hydraulic ram of FIG. 1. In some embodiments, such as shown in FIG. 2, one or more of the base edges and/or base ends may comprise a lip (119). In the embodiment shown in FIG. 2, the base first edge comprises a first lip (119A) while the base second edge comprises a second lip (119B). Each of the first lip and the second lip may independently be located at the base top surface (116 as shown in FIG. 4) along the respective base edge.

Certain embodiments of the base (100) may also comprise at least one base hole (210) in the base wall along one or more of the base edges and/or base ends. In the embodiment shown in FIG. 2, the base wall along the base first edge comprises at least one first base hole (210A) while the base wall along the base second edge comprises at least one second base hole. It is preferred that the base wall along the base first edge comprise more than one first base hole and/or that the base wall along the base second edge comprises more than one second base hole. In some embodiments, one or more—preferably all—of the first base hole(s) and/or the second base hole(s) will be threaded to accommodate threads of a fastener (200) such as a bolt.

FIG. 2 also shows the first plurality of teeth (130) integrally connected to the first tooth plate (131). As shown in FIG. 2, in some embodiments, the first tooth plate may comprise at least one first tooth plate hole (132), although it is preferred that—in such embodiments—the first tooth plate comprises at least two first tooth plate holes. Preferably, the number of first tooth plate holes and their location (vertical and horizontal location, size, and spacing) will match the number and location of first base holes (210A) of the base (100).

Also shown in FIG. 2 is the second plurality of teeth (140) integrally connected to the second tooth plate (141). As shown in FIG. 2, in some embodiments, the second tooth plate may comprise at least one second tooth plate hole (142), although it is preferred that—in such embodiments—the second tooth plate comprises at least two second tooth plate holes. Preferably, the number of second tooth plate holes and their location (vertical and horizontal location, size, and spacing) will match the number and location of second base holes of the base (100).

In the embodiments shown in FIG. 1 and FIG. 2, the first tooth plate (131) is connected to the base (100) by passing a fastener (200) through each of the first tooth plate hole(s) (132) and into the first base hole(s) (210A). The preferred fastener is a bolt having threads which are mated to threads of the first base hole(s). When the base (100) comprises a first lip (119A) along the base first edge (111), a top edge of the first tooth plate may abut against the first lip once assembled.

Similarly, the second tooth plate (141) is connected to the base (100) by passing a fastener (200) through each of the second tooth plate hole(s) (142) and into the second base hole(s). The preferred fastener is a bolt having threads which are matted to threads of the second base hole(s). When the base comprises a second lip (119B) along the base second edge (112), a top edge of the second tooth plate may abut against the second lip once assembled.

Figure 3:
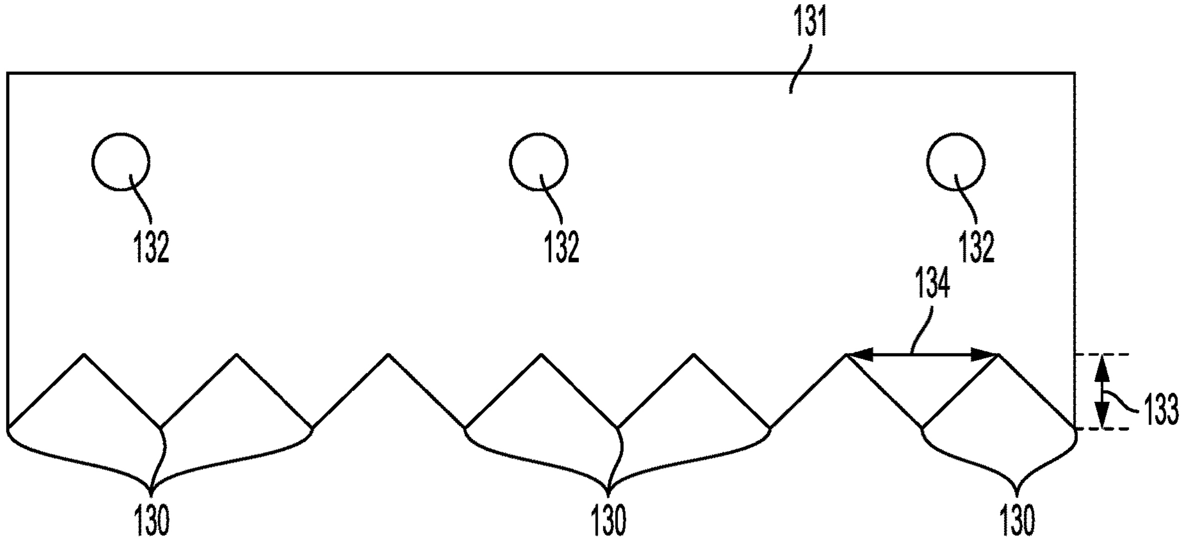
FIG. 3 is a side view of a plurality of teeth for an extension for a hydraulic ram.
Figure 7:
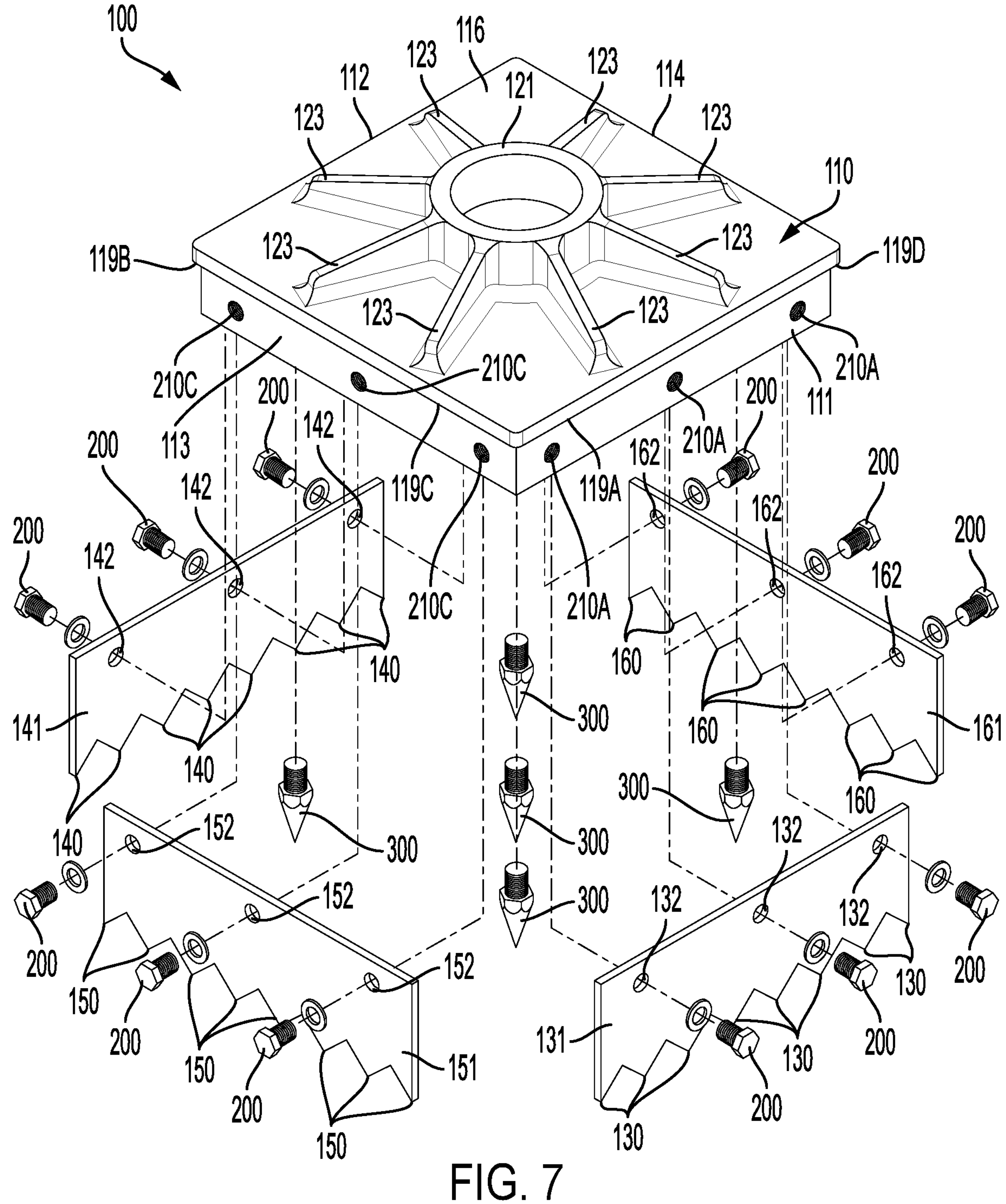
FIG. 7 is an exploded perspective view of the embodiment of an extension for a hydraulic ram of FIG. 6.

FIG. 3 shows a side view of an embodiment of a tooth plate. While the tooth plate shown in FIG. 3 will be referred to herein as the "first tooth plate", the type of tooth plate shown in FIG. 3 may be used as any of the first tooth plate (131), and/or the second tooth plate (141) (as shown in FIG. 1 and FIG. 2), and/or the third tooth plate (151) and/or the fourth tooth plate (161) (as shown in FIG. 6 and FIG. 7). As such, all information herein pertaining to the first tooth plate shown in FIG. 3 (including the first plurality of teeth and/or the first tooth plate hole(s)) applies equally to the second tooth plate (including the second plurality of teeth and/or the second tooth plate hole(s)), the third tooth plate (including the third plurality of teeth and/or the third tooth plate hole(s)), and the fourth tooth plate (including the fourth tooth plate hole(s)).

The first tooth plate (131) shown in FIG. 3 comprises the first plurality of teeth (130) extending therefrom. As shown in FIG. 3, the first plurality of teeth comprises six individual full teeth and two half teeth located at opposing ends of the first tooth plate. In practice, the number of teeth in the first plurality of teeth is not considered relevant. That is to say that the number of teeth in the first plurality of teeth may be in a range selected from the group consisting of between 2 and 100, between 2 and 50, between 2 and 25, between 2 and 10, between 5 and 100, between 5 and 50, between 5 and 25, and between 5 and 10.

Each tooth of the first plurality of teeth (130) will have a tooth length (133) and a tooth width (134) measured perpendicular to the tooth length as shown in FIG. 3. The tooth length of any individual tooth may be in a range selected from the group consisting of between 0.25 inches and 5.0 inches, between 0.25 inches and 4.0 inches, between 0.25 inches and 3.0 inches, between 0.25 inches and 2.0 inches, between 0.25 inches and 1.0 inches, between 0.5 inches and 5.0 inches, between 0.5 inches and 4.0 inches, between 0.5 inches and 3.0 inches, between 0.5 inches and 2.0 inches, and between 0.5 inches and 1.0 inches. Similarly, the tooth width of any individual tooth may be in a range selected from the group consisting of between 0.25 inches and 5.0 inches, between 0.25 inches and 4.0 inches, between 0.25 inches and 3.0 inches, between 0.25 inches and 2.0 inches, between 0.25 inches and 1.0 inches, between 0.5 inches and 5.0 inches, between 0.5 inches and 4.0 inches, between 0.5 inches and 3.0 inches, between 0.5 inches and 2.0 inches, and between 0.5 inches and 1.0 inches.

While FIG. 3 shows each tooth of the first plurality of teeth (130) having a substantially equilateral triangle shape, other triangular shapes may be used including a right triangle, an isosceles triangle, a scalene triangle, an acute triangle, or an obtuse triangle. It is not considered necessary for each tooth of the first plurality of teeth to be of the same triangle shape, or to have the same tooth length and/or tooth width.

FIG. 3 also shows the first tooth plate (131) comprising at least one first tooth plate hole (132). In the embodiment shown in FIG. 3, the first tooth plate comprises three first tooth plate holes, although other embodiments may exist. In general, the number of first tooth plate holes may be an integer in a range selected from the group consisting of between 1 and 10, between 1 and 8, between 1 and 5, between 1 and 3, between 2 and 10, between 2 and 8, between 2 and 5, between 5 and 10, between 5 and 8, and between 8 and 10.

The embodiment shown in FIG. 3 shows the first tooth plate holes (132) of the first tooth plate (130) having an ovular shape. However, it is not considered necessary for the first tooth plate hole(s) to have in ovular shape. In some embodiments, the first tooth plate hole(s) may have a circular shape. The shape of the first tooth plate hole(s) is not considered important with the exception that the first tooth plate hole(s) should be of sufficient size and shape to allow a fastener (200) to pass through the first tooth plate hole(s) for connecting the first tooth plate to the base (100) as described herein.

In some embodiments, one or more of the teeth of the first plurality of teeth, the second plurality of teeth, the third plurality of teeth, and/or the fourth plurality of teeth may have a concave or a convex curve along one or both of the tooth edges. In certain embodiments, one or more of the teeth of the first plurality of teeth, the second plurality of teeth, the third plurality of teeth, and/or the fourth plurality of teeth may have one or more serrated edges.

FIG. 4 shows a side view of an embodiment of a base (100) viewed perpendicular to one of the base edges. While the base edge shown in FIG. 4 will be referred to herein as the "base first edge", the type of base edge shown in FIG. 4 may be used as any of the base first edge (111), the base second edge (112), the base first end (113), and/or the base second end (114). As such, all information herein pertaining to the base first edge shown in FIG. 4 applies equally to the base second edge, the base first end, and the base second end.

As shown in FIG. 4, the base has a base horizontal plane (115) with the base horizontal plane defined by the base first edge (111 as shown in FIG. 2), the base second edge (112 as shown in FIG. 2), the base first end (113 as shown in FIG. 2), and the base second end (114 as shown in FIG. 2). The base also has a base top surface (116) and a base bottom surface (117) which is opposite the base bottom surface. A base wall (118) spans the distance between the base top surface and the base bottom surface.

FIG. 4 also shows the base first edge (111) comprising an optional first lip (119) at the base top surface (116). As shown in FIG. 4, the first lip—when used—preferably extends from the base wall (118) parallel with the base horizontal plane (115). When used, the first lip provides a surface against which a top edge of the first tooth plate (131 as shown in FIG. 2) abuts once the first tooth plate has been connected to the first edge by one or more fasteners (200 as shown in FIG. 2).

Further shown in FIG. 4 is a plurality of first base holes (210) along the base first edge (111). As shown in FIG. 4, the plurality of first base holes may be disposed in the base wall (118) with a central axis of each base hole being substantially parallel with the base horizontal plane (115). Each first base hole may independently be a blind hole or a through hole. Additionally, each first base hole may independently be a threaded hole or a non-threaded hole. When the first base hole is a threaded hole, the threads of the first base hole are preferably configured to mate with threads of a fastener (200 as shown in FIG. 2) such as a bolt. When the first base hole is a non-threaded through hole, the first base hole is preferably sized and shaped to allow a fastener—such as a bolt or a threaded stud—to pass through the first base hole along with the tooth plate holes of opposing tooth plates (i.e.—the first tooth plate and the second tooth plate, or the third tooth plate and the fourth tooth plate).

FIG. 4 further shows the hydraulic ram attachment mechanism (120) connected to and extending from the base top surface (116). The embodiment shown in FIG. 4 includes four optional reinforcing ribs (123) with each reinforcing rib comprising a first edge and a second edge extending substantially perpendicular from the first edge. As shown in FIG. 4—when used—the reinforcing ribs are integrally connected along the first edge to an outer surface of the cylinder portion of the hydraulic ram attachment mechanism with the second edge integrally connected to the base top surface.

Figure 5:
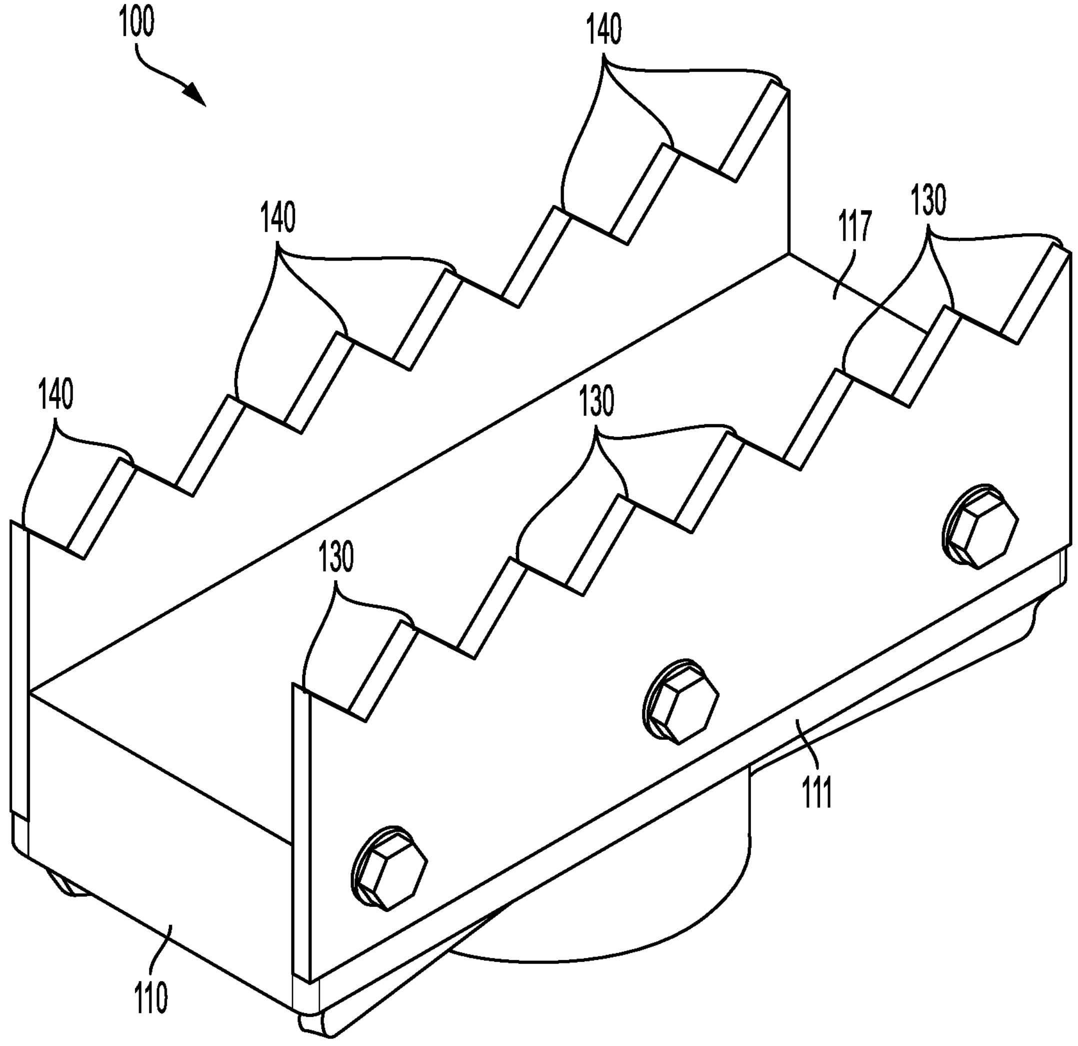
FIG. 5 is an alternative assembled perspective view of the embodiment of an extension for a hydraulic ram of FIG. 1.

FIG. 5 shows a perspective bottom view of the attachment (100) shown in FIG. 1. As shown in FIG. 5, the first plurality of teeth (130) extend from the base bottom surface (117) along the base first edge (111 as shown in FIG. 2) with the second plurality of teeth (140) extending from the base bottom surface along the base second edge (112 as shown in FIG. 2). As the base first edge is opposite of the base second edge, a channel may be formed between the first plurality of teeth and the second plurality of teeth.

FIG. 6 and FIG. 7 show an alternative embodiment of an attachment (100) for a hydraulic ram (10 as shown in FIG. 10) with FIG. 6 being an assembled view and FIG. 7 being an exploded view. As shown in FIG. 6 and FIG. 7, the attachment comprises a base (110), a hydraulic ram attachment mechanism, a first plurality of teeth (130), a second plurality of teeth (140), a third plurality of teeth (150), and a fourth plurality of teeth As shown in FIG. 7, the base (110) has a base first edge (111), a base second edge (112) opposite the base first edge, a base first end (113), and a base second end (114) opposite the base first end. This gives the base a quadrilateral profile, although other profiles may exist including a circular profile, an ovular profile, and a polygonal profile.

Figure 8:
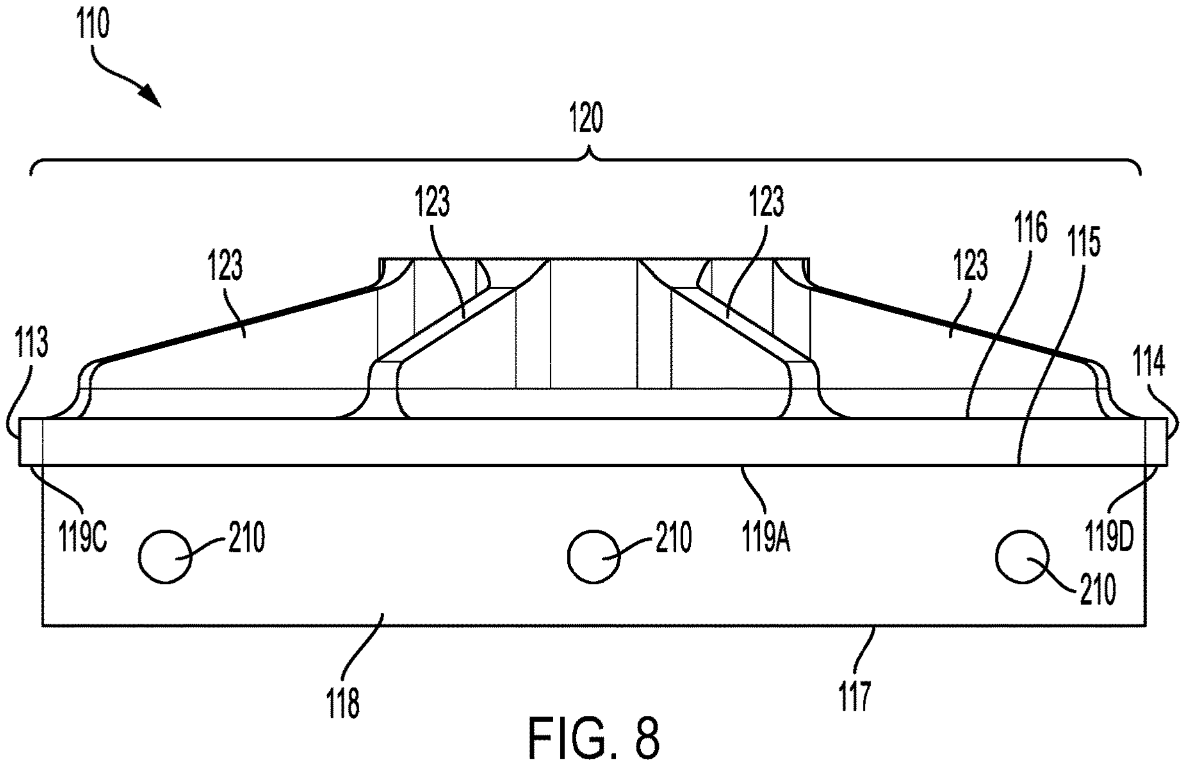
FIG. 8 is a side view of another embodiment of a base for an extension for a hydraulic ram.

The base first edge (111), base second edge (112), base first end (113), and base second end (114) define a base horizontal plane (115 as shown in FIG. 4) having a base top surface (116 as shown in FIG. 8) and a base bottom surface (117 as shown in FIG. 8) opposite the base top surface. A distance between the base top surface and the base bottom surface defines a base wall (118 as shown in FIG. 8) which may also be referred to herein as the base thickness.

The embodiment of an attachment (100) shown in FIG. 6 and FIG. 7 also includes a hydraulic ram attachment mechanism. The hydraulic ram attachment mechanism in the embodiment shown in FIG. 6 and FIG. 7 may be similar to or identical to that of the embodiment shown in FIG. 1 and FIG. 2. That is to say that the hydraulic ram attachment mechanism may comprise a circular cylinder (which may have a circular cross-sectional inner profile (121 as shown in FIG. 6 and FIG. 7), a quadrilateral cross-sectional inner profile (122 as shown in FIG. 12), an ovular cross-sectional inner profile, or a polygonal cross-sectional inner profile) connected to and extending from the base top surface (116 as shown in FIG. 8) as described herein with reference to FIG. 1 and FIG. 2. In some embodiments, the hydraulic ram attachment mechanism may also include one or more reinforcing ribs (123) as described herein with reference to FIG. 1 and FIG. 2.

Figure 9:
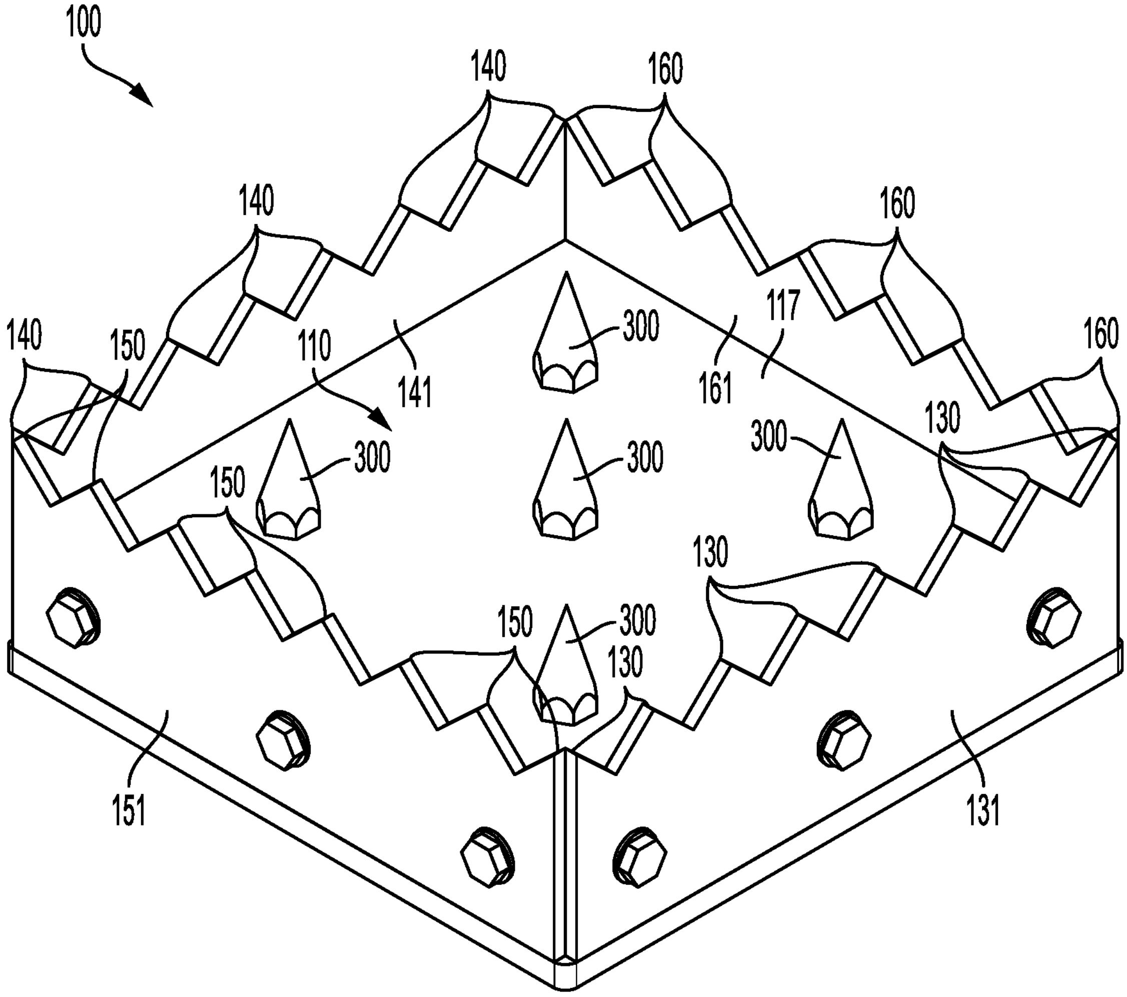
FIG. 9 is an alternative assembled perspective view of the embodiment of an extension for a hydraulic ram of FIG. 6.

The embodiment of an attachment (100) shown in FIG. 6 and FIG. 7 also includes a first plurality of teeth (130) extending from the base bottom surface (117 as shown in FIG. 9) along at least a portion of the base first edge (111), and a second plurality of teeth (140) extending from the base bottom surface along at least a portion of the base second edge (112). The first plurality of teeth and second plurality of teeth in the embodiment shown in FIG. 6 and FIG. 7 may be constructed, oriented, and connected to the base (100) in any of the same manners as disclosed herein relative to the embodiment shown in FIG. 1 and FIG. 2.

In the embodiment shown in FIG. 6 and FIG. 7, the attachment (100) further comprises a third plurality of teeth (150) and a fourth plurality of teeth (160). As shown in FIG. 6 and FIG. 7, the first plurality of teeth extend from the base bottom surface (117 as shown in FIG. 9) along at least a portion of the base first end (113). Similarly, the fourth plurality of teeth extend from the base bottom surface along at least a portion of the base second end (114). Preferably one or both of the third plurality of teeth and/or the fourth plurality of teeth will extend from the base bottom surface substantially perpendicular or perpendicular with the base horizontal plane (115 as shown in FIG. 4 and FIG. 6).

While the third plurality of teeth and fourth plurality of teeth may be integrally connected to the respective base edges—such as by manufacturing the base and the third plurality of teeth and/or the fourth plurality of teeth from a single integral piece of material—the preferred embodiments will have detachable teeth which are connected to the base by means of a fastener as described herein.

While the Figures show the third plurality of teeth along the entirety of the base first end and the fourth plurality of teeth along the entirety of the base second end, this is not considered necessary. In some embodiments, the second plurality of teeth may extend along only a portion of the base first end and/or the fourth plurality of teeth may extend along only a portion of the base second end.

In some embodiments, the third plurality of teeth (150) will be connected to a third tooth plate (151) with the third tooth plate connected to the base first end (113) as shown in FIG. 7. When used, the third plurality of teeth are preferably integrally connected to the third tooth plate such as by manufacturing the third plurality of teeth and the third tooth plate of a single integral piece of material. The third tooth plate may be connected to the base first end by at least one fastener (200) such as a bolt, a screw, a clip, a rivet, a pin, or the like.

Similarly, in some embodiments the fourth plurality of teeth (160) will be connected to a fourth tooth plate (161) with the fourth tooth plate connected to the base second end (114) as shown in FIG. 7. When used, the fourth plurality of teeth are preferably integrally connected to the fourth tooth plate such as by manufacturing the fourth plurality of teeth and the fourth tooth plate of a single integral piece of material. The fourth tooth plate may be connected to the base second end by at least one fastener (200) such as a bolt, a screw, a clip, a rivet, or the like.

FIG. 7 shows an exploded perspective view of the embodiment of the attachment (100) for a hydraulic ram of FIG. 6. In some embodiments, such as shown in FIG. 7, one or more of the base edges and/or base ends may comprise a lip (119). In the embodiment shown in FIG. 7, the base first edge comprises a first lip (119A), the base second edge comprises a second lip (119B), the base first end comprises a base third lip (119C), and the base second end comprises a fourth lip (119D). Each of the first lip, the second lip, the third lip, and the fourth lip may independently be located at the base top surface (116 as shown in FIG. 8) along the respective base edge or base end.

Certain embodiments of the base (100) shown in FIG. 6 and FIG. 7 may also comprise at least one base hole (210) in the base wall (118) along one or more of the base edges and/or base ends. In the embodiment shown in FIG. 6 and FIG. 7, the base wall along the base first edge comprises at least one first base hole (210A), the base wall along the base second edge comprises at least one second base hole, the base wall along the base first end comprises at least one third base hole (210C), and the base wall along the base second end comprises at least one fourth base hole. It is preferred that the base wall along one or more of the base first edge, the base second edge, the base first end, and the base second end comprise more than one base hole. In some embodiments, one or more—preferably all—of the first base hole (s), the second base hole(s), the third base hole(s), and/or the fourth base hole(s) will be threaded to accommodate threads of a fastener (200) such as a bolt.

FIG. 7 also shows the third plurality of teeth (150) integrally connected to the third tooth plate (151). As shown in FIG. 7, in some embodiments, the third tooth plate may comprise at least one third tooth plate hole (152), although it is preferred that—in such embodiments—the third tooth plate comprises at least two third tooth plate holes. Preferably, the number of third tooth plate holes and their location (vertical and horizontal location, size, and spacing) will match the number and location of third base holes (210C) of the base (100).

Also shown in FIG. 7 is the fourth plurality of teeth (160) integrally connected to the fourth tooth plate (161). As shown in FIG. 7, in some embodiments, the fourth tooth plate may comprise at least one fourth tooth plate hole (162), although it is preferred that—in such embodiments—the fourth tooth plate comprises at least two fourth tooth plate holes. Preferably, the number of fourth tooth plate holes and their location (vertical and horizontal location, size, and spacing) will match the number and location of second base holes of the base (100).

In the embodiment shown in FIG. 6 and FIG. 7, the third tooth plate (151) is connected to the base (100) by passing a fastener (200) through each of the third tooth plate hole(s) (152) and into the third base hole(s) (210C). The preferred fastener is a bolt having threads which are mated to threads of the third base hole(s). When the base (100) comprises a third lip (119C) along the base first end (113), a top edge of the third tooth plate may abut against the third lip once assembled.

Similarly, the fourth tooth plate (161) is connected to the base (100) by passing a fastener (200) through each of the fourth tooth plate hole(s) (162) and into the fourth base hole(s). The preferred fastener is a bolt having threads which are mated to threads of the fourth base hole(s). When the base (100) comprises a fourth lip (119D) along the base second end (114), a top edge of the fourth tooth plate may abut against the fourth lip once assembled.

FIG. 8 shows a side view of an embodiment of a base (100) viewed perpendicular to one of the base ends. While the base embodiment shown in FIG. 4 may be used in the embodiment of an attachment shown in FIG. 1 and FIG. 2, the base embodiment shown in FIG. 8 may be used in the embodiment of an attachment shown in FIG. 6 and FIG. 7.

While the base end shown in FIG. 8 will be referred to herein as the "base first edge", the type of base end shown in FIG. 8 may be used as any of the base second edge (112), the base first end (113), and/or the base second end (114). As such, all information herein pertaining to the base first edge shown in FIG. 8 applies equally to the base second edge, the base first end, and the base second end.

As shown in FIG. 8, the base has a base horizontal plane (115) with the base horizontal plane defined by the base first edge (111 as shown in FIG. 7), the base second edge (112 as shown in FIG. 7), the base first end (113 as shown in FIG. 7), and the base second end (114 as shown in FIG. 7). The base also has a base top surface (116) and a base bottom surface (117) which is opposite the base bottom surface. A base wall (118) spans a distance between the base top surface and the base bottom surface.

FIG. 8 also shows the base first edge (111) comprising an optional first lip (119A) at the base top surface (116), the base first end (113) comprising an optional third lip (119C) at the base top surface, and the base second end (114) comprising an optional fourth lip (119D) at the base top surface. As shown in FIG. 8, the first lip, third lip, and/or fourth lip—when used—preferably extends from the base wall (118) parallel with the base horizontal plane (115). When used, the first lip, third lip, and/or fourth lip provides a surface against which a top edge of the respective first tooth plate (131 as shown in FIG. 7), third tooth plate (151 as shown in FIG. 7), and/or fourth tooth plate (161 as shown in FIG. 7) abuts once the respective tooth plate has been connected to the appropriate edge/end by one or more fasteners (200 as shown in FIG. 7).

Further shown in FIG. 8 is a plurality of first base holes (210) along the base first edge (111). As shown in FIG. 8, the plurality of first base holes may be disposed in the base wall (118) with a central axis of each first base hole being substantially parallel with the base horizontal plane (115). Each first base hole may independently be a blind hole or a through hole. Additionally, each first base hole may independently be a threaded hole or a non-threaded hole. When the first base hole is a threaded hole, the threads of the first base hole are preferably configured to mate with threads of a fastener (200 as shown in FIG. 7) such as a bolt. When the first base hole is a non-threaded through hole, the first base hole is preferably sized and shaped to allow a fastener—such as a bolt or a threaded stud—to pass through the first base hole along with the tooth plate holes of opposing tooth plates (i.e.—the first tooth plate and the second tooth plate, or the third tooth plate and the fourth tooth plate).

FIG. 8 further shows the hydraulic ram attachment mechanism (120) connected to and extending from the base top surface (116). The embodiment shown in FIG. 8 includes six optional reinforcing ribs (123) with each reinforcing rib comprising a first edge and a second edge extending substantially perpendicular from the first edge. As shown in FIG. 8—when used—the reinforcing ribs are integrally connected along the first edge to an outer surface of the cylinder portion of the hydraulic ram attachment mechanism with the second edge integrally connected to the base top surface.

FIG. 9 shows a perspective bottom view of an embodiment of an attachment (100) similar to that shown in FIG. 6. As shown in FIG. 9, in some embodiments, the attachment may also comprise at least one spike (300) connected to and extending from the base bottom surface (117). When present, the at least one spike may comprise a plurality of spikes. The positioning of the spikes along the base bottom surface is not considered important. However, in some embodiments, the plurality of spikes may be arranged in an "X" pattern along the base bottom surface as shown in FIG. 9.

The spikes (300) may be integrally connected to the base (100) such as by welding each spike to the base or by manufacturing the spikes and the base of a single continuous piece of material. However, it is preferred that the spikes be removable. In some embodiments, a removable spike may comprise a threaded stud at one end which passes into a threaded hole in the base bottom surface (117). In other embodiments, a removable spike may comprise a threaded hole configured to receive a fastener—such as a bolt—extending from the base bottom surface.

Each spike (300) will have a spike length. While the spike length of any one individual spike may differ from the spike length of any other individual spike, it is preferred that the spike length of each spike be substantially similar if not identical. In some embodiments, the spike length of each individual spike will be substantially equal to—or identical to—a first tooth length of the first plurality of teeth, a second tooth length of the second plurality of teeth, a third tooth length of the third plurality of teeth, and/or a fourth tooth length of the fourth plurality of teeth. However, embodiments may exist in which the spike length(s) are less than or greater than the tooth length(s).

Figure 11:
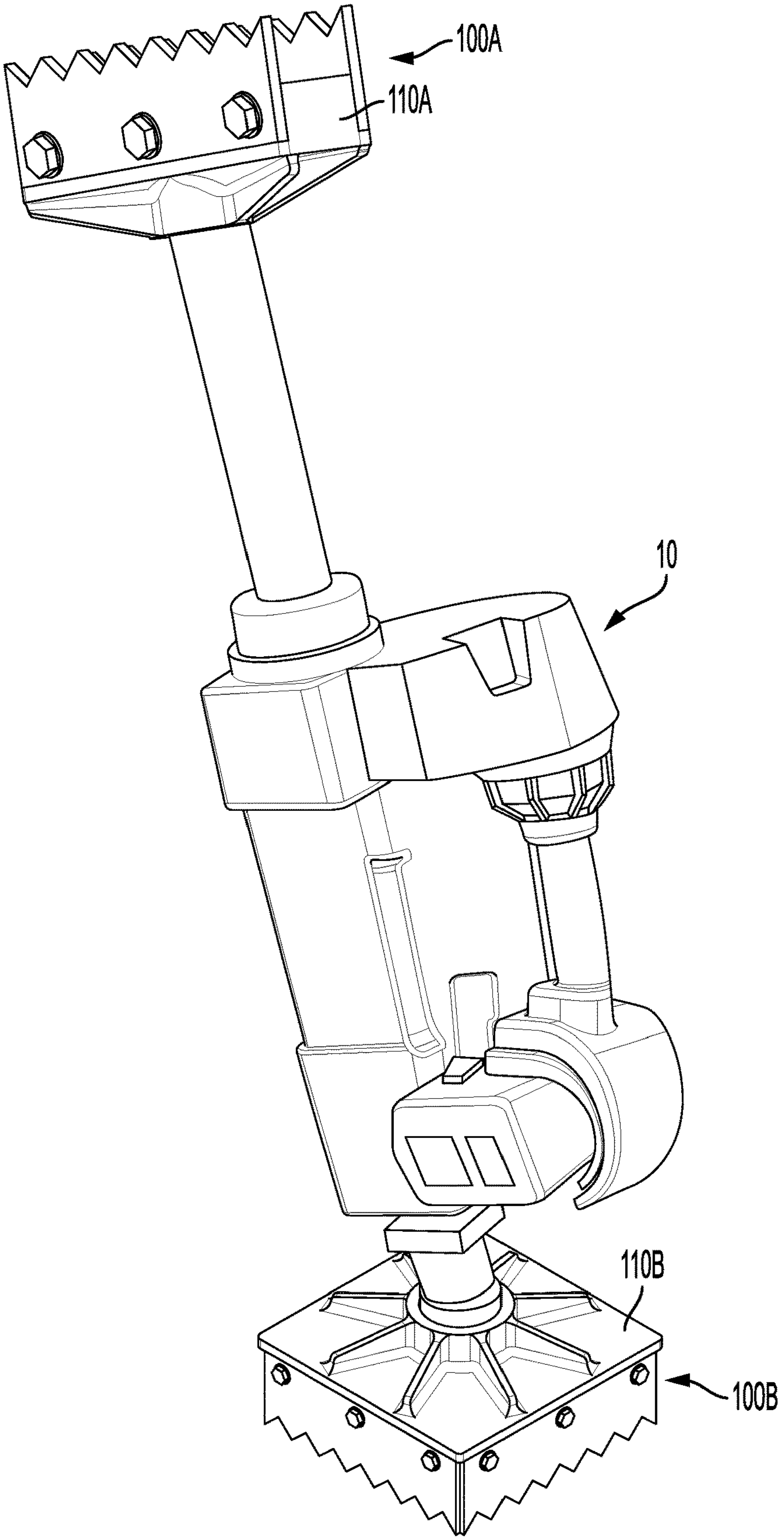
FIG. 11 is an assembled perspective view of FIG. 10.

FIG. 10 and FIG. 11 show exploded (FIG. 10) and assembled (FIG. 11) views of embodiments of attachments (100A and 100B) attached to opposing ends of a hydraulic ram (10). As shown in FIG. 10 and FIG. 11, the attachments may be thought of as a first attachment (100A) connected to a hydraulic ram first end and a second attachment (100B) connected to a hydraulic ram second end opposite the hydraulic ram first end.

While FIG. 10 and FIG. 11 show the first attachment (100A) being of the type shown in FIG. 1 and FIG. 2 with the second attachment (100B) being of the type shown in FIG. 6 and FIG. 7, such configuration is not considered necessary. In some embodiments, both the first attachment and the second attachment may be of the type shown in FIG. 1 and FIG. 2. In other embodiments, both the first attachment and the second attachment may be of the type shown in FIG. 6 and FIG. 7. In still other embodiments, the first attachment may be of the type shown in FIG. 6 and FIG. 7 while the second attachment may be of the type shown in FIG. 1 and FIG. 2.

FIG. 12 shows an alternative embodiment of a hydraulic ram attachment mechanism (120) comprising a plurality of reinforcing ribs (123). While the embodiment shown in FIG. 1 through FIG. 11 shows the hydraulic ram attachment mechanism comprising a circular cylinder having a circular cross-sectional inner profile (121), the embodiment shown in FIG. 12 shows the hydraulic ram attachment mechanism comprising a circular cylinder having a quadrilateral cross-sectional inner profile (123). The shape of the hydraulic ram attachment mechanism may be achieved by manufacturing the attachment (100) with a hydraulic ram attachment mechanism having a cylinder with a defined radial cross-sectional inner profile (circular, quadrilateral, ovular, polygonal). In some embodiments, the hydraulic ram attachment mechanism may be made to have variable profiles by providing a series of inserts designed to fit within the hollow interior of the hydraulic ram attachment mechanism with each insert having a different inner profile (circular, quadrilateral, ovular, polygonal).

Figure 13:
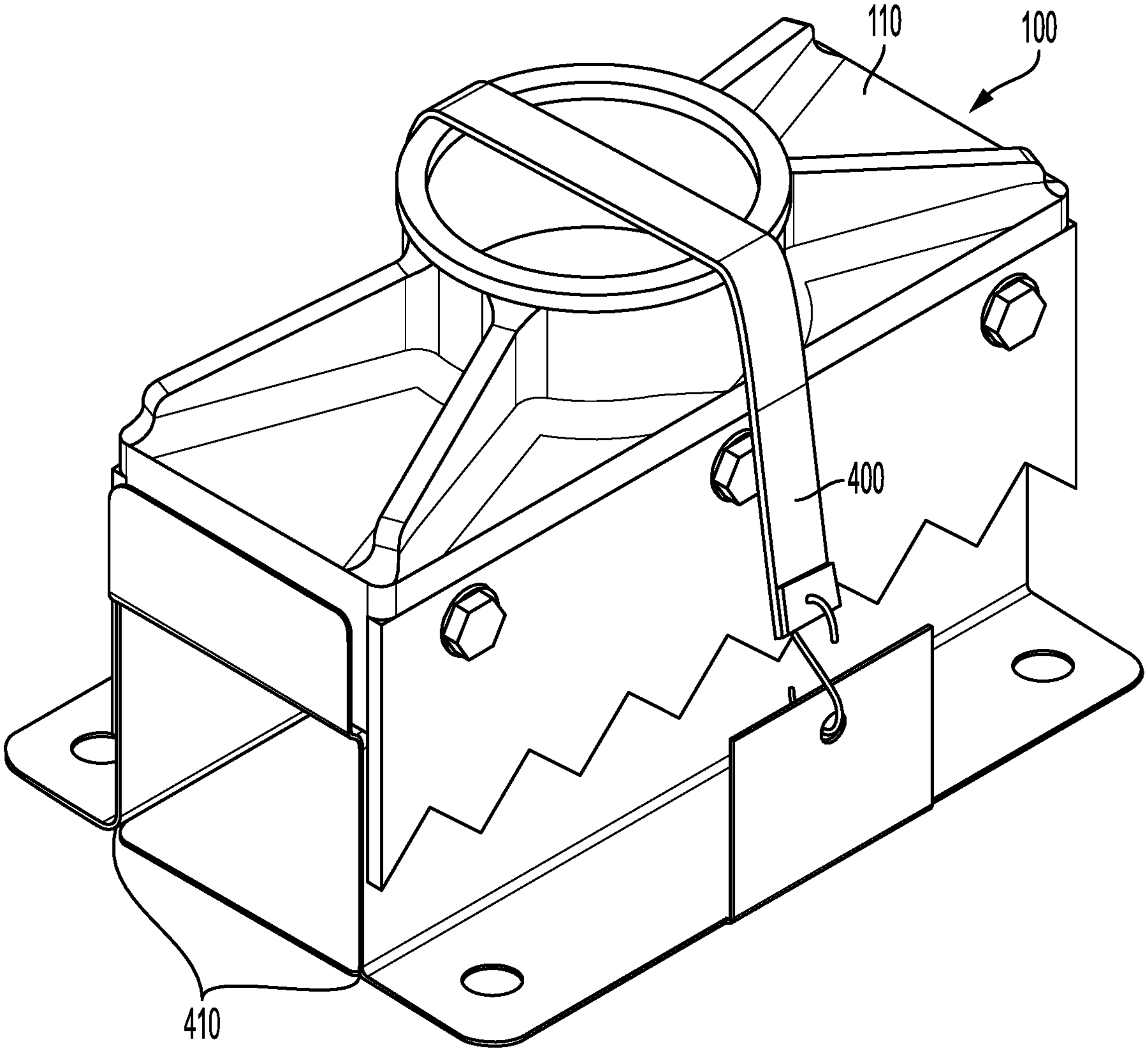
FIG. 13 is an assembled perspective view of an alternative embodiment of an extension for a hydraulic ram.

The attachment (100) may also be provided in the form of an attachment kit comprising one or more bases (110) of any type disclosed herein, one or more tooth plates of any type disclosed herein, one or more fasteners (200) of any type disclosed herein, and optionally one or more spikes (300) of any type disclosed herein. In some embodiments, the kit may also be provided with one or more storage mechanism such as shown in FIG. 13. The storage may comprise a generally “U” shaped channel (410) having a channel width less than the distance between at least two opposing walls of the base (with tooth plate(s)—when used—attached thereto). Each channel may have a pair of tabs extending from opposite edges thereof with a hole in each tab. The attachment may be placed over the “U” shaped channel with a strap being disposed over top of the attachment and spanning between the opposing tabs. Such a storage mechanism reduces or prevents the risk of injury to a user caused by the teeth when handling the attachment.

The various components of the attachment—including the base and the various tooth plates—may be manufactured using a number of different techniques known in the art and those yet to be developed. Non-limiting examples of such manufacturing techniques include subtractive manufacturing (such as CNC machining), welding, additive manufacturing (sometimes referred to as 3D printing), casting, and forging. Any or all of the components may be subjected to post manufacturing treatments such as heat treating, galvanizing, painting, powder coating or the like which impart the component(s) with certain physical properties and/or provide a protective outer coating for the component(s).

The various components may be manufactured of any rigid material with rigid metals such as aluminum, aluminum alloys, steel, stainless steel, cast iron, titanium, copper, and brass being the preferred materials. In preferred embodiments, the base will be manufactured of aluminum or an aluminum alloy. The tooth plates in preferred embodiments will be manufactured of steel or stainless steel.

The attachments disclosed herein are an improvement on existing hydraulic ram plates. The teeth of the attachments disclosed herein provide a gripping force against a surface of a vehicle and/or the ground as the case may be which stabilizes the hydraulic ram during operation and reduces or prevents slippage. The increased stabilization and control may be further improved by the operator generally aligning the portion of the vehicle against which the attachment is disposed during use with the cylinder portion of the hydraulic ram attachment mechanism such that the force applied by the hydraulic ram is more evenly distributed through the attachment. Additionally, when the attachments disclosed herein utilize tooth plate(s) attached to the base by fasteners, the teeth may be easily removed from the attachment and replaced when damaged or to adapt the tooth profile to different surfaces.

What is claimed is:

1. An attachment (100) for a hydraulic ram (10) comprising:

- a base (110) comprising a base first edge (111), a base second edge (112), a base first end (113) and a base second end (114) defining a base horizontal plane (115) having a base top surface (116) and a
- base bottom surface (117) with a base wall (118) spanning a distance between the base top surface and the base bottom surface;
- a hydraulic ram attachment mechanism (120) directly connected to the base top surface; and
- at least a first plurality of teeth (130) and a second plurality of teeth (140); and
- wherein all of the first plurality of teeth extend perpendicularly from the base bottom surface along at least a portion of the base first edge, all of the second plurality of teeth extend perpendicularly from the base bottom surface along at least a portion of the base second edge, and
- wherein the hydraulic ram attachment mechanism comprises a blind hole and is configured to receive an end of the hydraulic ram by passing the end of the hydraulic ram into the hydraulic ram attachment mechanism.

2. The attachment for a hydraulic ram of claim 1, wherein the base wall comprises at least one first base hole (210) along the base first edge and at least one second base hole along the base second edge, the first plurality of teeth are integrally connected to a first tooth plate (131) comprising at least one first tooth plate hole (132), the second plurality of teeth are integrally connected to a second tooth plate (141) comprising at least one second tooth plate hole (142), the first tooth plate is connected to the base along the base first edge by at least a first fastener (200) passing through the first tooth plate hole and into the first base hole, and the second tooth plate is connected to the base along the base second edge by at least a second fastener passing through the second tooth plate hole and into the second base hole.

3. The attachment for a hydraulic ram of claim 2, wherein the base first edge comprises a first lip (119) at the base top surface and a top edge of the first tooth plate abuts against the first lip, and the base second edge comprises a second lip at the base top surface and a top edge of the second tooth plate abuts against the second lip.

4. The attachment for a hydraulic ram of claim 1, further comprising at least a third plurality of teeth (150) and a fourth plurality of teeth (160), wherein all of the third plurality of teeth extend perpendicularly from the base bottom surface along at least a portion of the base first end, and all of the fourth plurality of teeth extend perpendicularly from the base bottom surface along at least a portion of the base second end.

5. The attachment for a hydraulic ram of claim 4, wherein the base wall comprises at least one third base hole along the base first end and at least one fourth base hole along the base second end, the third plurality of teeth are integrally connected to a third tooth plate (151) comprising at least one third tooth plate hole (152), the fourth plurality of teeth are integrally connected to a fourth tooth plate (161) comprising at least one fourth tooth plate hole (162), the third tooth plate is connected to the base along the base first end by at least a third fastener passing through the third tooth plate hole and into the third base hole, and the fourth tooth plate is connected to the base along the base second end by at least a fourth fastener passing through the fourth tooth plate hole and into the fourth base hole.

6. The attachment for a hydraulic ram of claim 5, wherein the base first end comprises a third lip at the base top surface and a top edge of the third tooth plate abuts against the third lip, and the base second end comprises a fourth lip at the base top surface and a top edge of the fourth tooth plate abuts against the fourth lip.

7. The attachment for a hydraulic ram of claim 1, further comprising at least one spike (300) connected to and extending from the base bottom surface.

8. The attachment for a hydraulic ram of claim 7, wherein the at least one spike has a spike length which is substantially equal to a first tooth length of the first plurality of teeth and/or a second tooth length of the second plurality of teeth.

9. The attachment for a hydraulic ram of claim 7, wherein the at least one spike comprises a plurality of spikes.

10. The attachment for a hydraulic ram of claim 9, wherein the plurality of spikes are arranged in an "X" pattern along the base bottom surface.

11. The attachment for a hydraulic ram of claim 1, wherein the hydraulic ram attachment mechanism comprises a cylinder having a radial cross-sectional inner profile shape selected from the group consisting of circular, ovular, quadrilateral, and polygonal.

12. The attachment for a hydraulic ram of claim 11, wherein the hydraulic ram attachment mechanism comprises at least one reinforcing rib (123) wherein each reinforcing rib comprises a first edge and a second edge extending substantially perpendicular from the first edge, the first edge of each reinforcing rib is integrally connected to an outer surface of the cylinder, and the second edge of each reinforcing rib is integrally connected to the base top surface.

13. The attachment for a hydraulic ram of claim 1, wherein the base is made of a first material comprising aluminum.

14. The attachment for a hydraulic ram of claim 1, wherein the first plurality of teeth and the second plurality of teeth are each independently made of a material comprising steel.

15. The attachment for a hydraulic ram of claim 4, wherein the third plurality of teeth and the fourth plurality of teeth are each independently made of a material comprising steel.

16. A hydraulic ram (10) comprising at least a first attachment and a second attachment wherein the first attachment and the second attachment are each the attachment of claim 1, the first attachment is connected to a hydraulic ram first end, and the second attachment is connected to a hydraulic ram second end opposite the hydraulic ram first end.

17. The attachment for a hydraulic ram of claim 2, further comprising at least a third plurality of teeth (150) and a fourth plurality of teeth (160), wherein all of the third plurality of teeth extend perpendicularly from the base bottom surface along at least a portion of the base first end, and all of the fourth plurality of teeth extend perpendicularly from the base bottom surface along at least a portion of the base second end.

18. The attachment for a hydraulic ram of claim 17, wherein the base wall comprises at least one third base hole along the base first end and at least one fourth base hole along the base second end, the third plurality of teeth are integrally connected to a third tooth plate (151) comprising at least one third tooth plate hole (152), the fourth plurality of teeth are integrally connected to a fourth tooth plate (161) comprising at least one fourth tooth plate hole (162), the third tooth plate is connected to the base along the base first end by at least a third fastener passing through the third tooth plate hole and into the third base hole, and the fourth tooth plate is connected to the base along the base second end by at least a fourth fastener passing through the fourth tooth plate hole and into the fourth base hole.

19. The attachment for a hydraulic ram of claim 18, wherein the base first end comprises a third lip at the base top surface and a top edge of the third tooth plate abuts against the third lip, and the base second end comprises a fourth lip at the base top surface and a top edge of the fourth tooth plate abuts against the fourth lip.

20. The attachment for a hydraulic ram of claim 4, further comprising at least one spike (300) connected to and extending from the base bottom surface.

* * * * *